US008600300B2

(12) United States Patent
Lee et al.

(10) Patent No.: US 8,600,300 B2
(45) Date of Patent: Dec. 3, 2013

(54) METHOD AND SYSTEM FOR SINGLE CHIP WLAN AND BLUETOOTH RADIOS ON A SINGLE CMOS SUBSTRATE

(75) Inventors: Chungyeol Paul Lee, San Diego, CA (US); Bojko Marholev, Irvine, CA (US); Arya Behzad, Poway, CA (US); Mark Gonikberg, Los Altos Hills, CA (US); Brima Babatunde Ibrahim, Aliso Viejo, CA (US); Thomas Varghese, Karnataka (IN)

(73) Assignee: Broadcom Corporation, Irvine, CA (US)

( * ) Notice: Subject to any disclaimer, the term of this patent is extended or adjusted under 35 U.S.C. 154(b) by 776 days.

(21) Appl. No.: 11/618,869

(22) Filed: Dec. 31, 2006

(65) Prior Publication Data
US 2008/0139123 A1    Jun. 12, 2008

Related U.S. Application Data

(60) Provisional application No. 60/868,818, filed on Dec. 6, 2006.

(51) Int. Cl.
*H04B 5/00* (2006.01)
(52) U.S. Cl.
USPC .......................................................... 455/41.2
(58) Field of Classification Search
USPC .......... 455/63.1, 41.2; 375/224; 323/312–317
See application file for complete search history.

(56) References Cited

U.S. PATENT DOCUMENTS

| 6,735,456 | B2 * | 5/2004 | Cathey et al. ................. 455/574 |
| 6,738,601 | B1 * | 5/2004 | Rofougaran et al. ......... 455/66.1 |
| 6,930,537 | B1 * | 8/2005 | Ceekala et al. ............... 327/539 |
| 2002/0173337 | A1 | 11/2002 | Hajimiri et al. |
| 2004/0162023 | A1 | 8/2004 | Cho |
| 2006/0068837 | A1 | 3/2006 | Malone |
| 2006/0084383 | A1 * | 4/2006 | Ibrahim et al. ............... 455/41.2 |
| 2006/0199562 | A1 | 9/2006 | Taylor |
| 2006/0270346 | A1 | 11/2006 | Ibrahim et al. |
| 2007/0223430 | A1 * | 9/2007 | Desai et al. ................... 370/338 |

FOREIGN PATENT DOCUMENTS

| EP | 1729464 | 12/2006 |
| JP | 2005136896 | 5/2005 |

OTHER PUBLICATIONS

European Search Report for European Patent Application Serial No. 07012850.9-2411, dated Jan. 8, 2010.
European Patent Office, Communication with European Search Report, European patent application No. 07012850.9-2411, dated Mar. 30, 2010.
Taiwanese Search Report in related copending Taiwanese application No. 1012003019001, mailed on Jan. 11, 2012.

* cited by examiner

*Primary Examiner* — Andrew Wendell
*Assistant Examiner* — David Bilodeau
(74) *Attorney, Agent, or Firm* — Thomas | Horstemeyer, LLP (57) ABSTRACT

Aspects of a method and system for single chip WLAN and Bluetooth radios on a single CMOS substrate are presented. Aspects of the system may include a WLAN receiver circuit within a substrate of a single chip that enables reception of WLAN signals, and a Bluetooth receiver circuit within the same substrate that enables reception of Bluetooth signals. The WLAN receiver circuit and Bluetooth receiver circuit may utilize a single low noise amplifier circuit that enables reception of the WLAN signals and Bluetooth signals. Aspects of the system may also include a WLAN transmitter circuit within a substrate of a single chip that enables transmission of WLAN signals, and a Bluetooth transmitter circuit within the same substrate that enables transmission of Bluetooth signals. The WLAN transmitter circuit and Bluetooth transmitter circuit may utilize a single power amplifier circuit that enables transmission of the WLAN signals and Bluetooth signals.

18 Claims, 7 Drawing Sheets

METHOD AND SYSTEM FOR SINGLE CHIP WLAN AND BLUETOOTH RADIOS ON A SINGLE CMOS SUBSTRATE

CROSS-REFERENCE TO RELATED APPLICATIONS/INCORPORATION BY REFERENCE

This application makes reference to, claims priority to, and claims the benefit of U.S. Provisional Application Ser. No. 60/868,818, filed on Dec. 6, 2006.

The above stated application is hereby incorporated herein by reference in its entirety.

FIELD OF THE INVENTION

Certain embodiments of the invention relate to electronic power amplification. More specifically, certain embodiments of the invention relate to a method and system for single chip WLAN and Bluetooth radios on a single CMOS substrate.

BACKGROUND OF THE INVENTION

As mobile, wireless, and/or handheld portable devices increasingly become multifunctional, "all-in-one," communication devices, these handheld portable devices integrate an increasingly wide range of functions for handling a plurality of wireless communication services. For example, a single handheld portable device may enable Bluetooth communications and wireless local area network (WLAN) communications.

Much of the front end processing for wireless communications services is performed in analog circuitry. Front end processing within a portable device may comprise a range of operations that involve the reception of radio frequency (RF) signals, typically received via an antenna that is communicatively coupled to the portable device. Receiver tasks performed on an RF signal may include downconversion, filtering, and analog to digital conversion (ADC), for example. The resulting signal may be referred to as a baseband signal. The baseband signal typically contains digital data, which may be subsequently processed in digital circuitry within the portable device.

Front end processing within a portable device may also include transmission of RF signals. Transmitter tasks performed on a baseband signal may include digital to analog conversion (DAC), filtering, upconversion, and power amplification (PA), for example. The power amplified, RF signal, is typically transmitted via an antenna that is communicatively coupled to the portable device by some means. The antenna utilized for receiving an RF signal at a portable device may or may not be the same antenna that is utilized for transmitting an RF signal from the portable device.

One limitation in the inexorable march toward increasing integration of wireless communications services in a single portable device is that the analog RF circuitry for each separate wireless communication service may be implemented in a separate integrated circuit (IC) device (or chip). This may result in a number of disadvantages and/or limitations in such portable devices. For example, the increasing chip count may limit the extent to which the physical dimensions of the portable device may be miniaturized. Thus, the increasing integration may result in physically bulky devices, which may be less appealing to consumer preferences. The chip count may be further increased due to the need to replicate ancillary circuitry associated with each RF IC. For example, each RF IC may require separate low noise amplifier (LNA) circuitry, separate PA circuitry, and separate crystal oscillator (XO) circuitry for generation of clocking and timing signals within each RF IC. Similar replication may occur for digital IC devices utilized for processing of baseband signals from each separate wireless communication service.

Along with an increasing IC component count, there may also be a corresponding rise in power consumption within the portable device. This may present another set of disadvantages, such as increased operating temperature, and reduced battery life between recharges.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for single chip WLAN and Bluetooth radios on a single CMOS substrate, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for single chip WLAN and Bluetooth radios on a single complimentary metal-oxide-semiconductor (CMOS) substrate. Various embodiments of the invention comprise integrating WLAN analog circuitry, WLAN digital circuitry, Bluetooth (BT) analog circuitry, and BT digital circuitry in a single CMOS IC, implemented on a single semiconductor substrate. The integration of the WLAN and BT circuitry in a single CMOS substrate may enable common circuitry to be utilized for both WLAN and BT front end processing. For example, a single LNA circuit may be utilized for reception of WLAN and BT signals, a single PA circuit may also be utilized for both WLAN and BT front end processing, and a single XO circuit may be utilized for generating timing signals for transmission and reception of both WLAN and BT signals.

Figure 1:
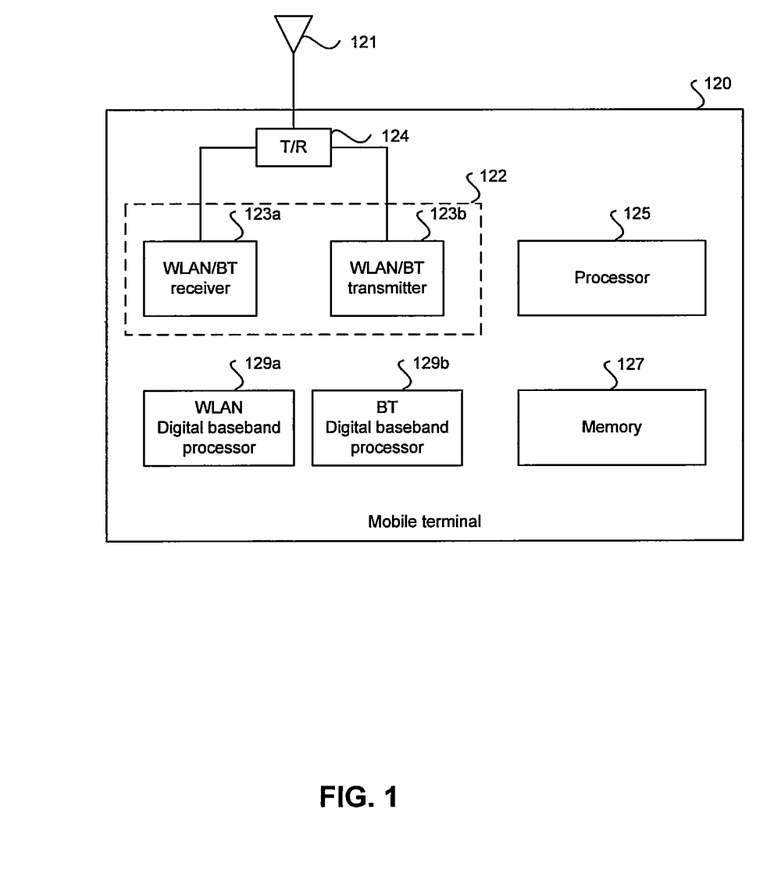
FIG. 1 is a block diagram illustrating and exemplary mobile terminal that comprises a single chip WLAN and Bluetooth radio on a single CMOS substrate, in accordance with an embodiment of the invention.

FIG. 1 is a block diagram illustrating and exemplary mobile terminal that comprises a single chip WLAN and Bluetooth radio on a single CMOS substrate, in accordance with an embodiment of the invention. Referring to FIG. 1, there is shown mobile terminal 120 that may comprise a WLAN and BT (WLAN/BT) receiver 123a, a WLAN and BT (WLAN/BT) transmitter 123b, a WLAN digital baseband processor 129a, a BT digital baseband processor 129b, a processor 125, and a memory 127. In some embodiments of the invention, the WLAN/BT receiver 123a, and WLAN/BT transmitter 123b may be integrated into a WLAN/BT transceiver 122, for example. A single transmit and receive antenna 121 may be communicatively coupled to the WLAN/BT receiver 123a and the WLAN/BT transmitter 123b. A switch 124, or other device having switching capabilities may be coupled between the WLAN/BT receiver 123a and WLAN/BT transmitter 123b, and may be utilized to switch the antenna 121 between transmit and receive functions.

The WLAN/BT receiver 123a may comprise suitable logic, circuitry, and/or code that may enable processing of received WLAN RF signals and/or BT RF signals. The WLAN/BT receiver 123a may enable receiving RF signals in frequency bands utilized by WLAN and/or BT communication systems.

The WLAN digital baseband processor 129a may comprise suitable logic, circuitry, and/or code that may enable processing and/or handling of WLAN baseband signals. In this regard, the WLAN digital baseband processor 129a may process or handle WLAN signals received from the WLAN/BT receiver 123a and/or WLAN signals to be transferred to the WLAN/BT transmitter 123b for transmission via a wireless communication medium. The WLAN digital baseband processor 129a may also provide control and/or feedback information to the WLAN/BT receiver 123a and to the WLAN/BT transmitter 123b, based on information from the processed WLAN signals. The WLAN digital baseband processor 129a may communicate information and/or data from the processed WLAN signals to the processor 125 and/or to the memory 127. Moreover, the WLAN digital baseband processor 129a may receive information from the processor 125 and/or to the memory 127, which may be processed and transferred to the WLAN/BT transmitter 123b for transmission of WLAN signals via the wireless communication medium.

The BT digital baseband processor 129b may comprise suitable logic, circuitry, and/or code that may enable processing and/or handling of BT baseband signals. In this regard, the BT digital baseband processor 129b may process or handle BT signals received from the WLAN/BT receiver 123a and/or BT signals to be transferred to the WLAN/BT transmitter 123b for transmission via a wireless communication medium. The BT digital baseband processor 129b may also provide control and/or feedback information to the WLAN/BT receiver 123a and to the WLAN/BT transmitter 123b, based on information from the processed BT signals. The BT digital baseband processor 129b may communicate information and/or data from the processed BT signals to the processor 125 and/or to the memory 127. Moreover, the BT digital baseband processor 129b may receive information from the processor 125 and/or to the memory 127, which may be processed and transferred to the WLAN/BT transmitter 123b for transmission of BT signals via the wireless communication medium.

The WLAN/BT transmitter 123b may comprise suitable logic, circuitry, and/or code that may enable processing of WLAN and/or BT signals for transmission. The WLAN/BT transmitter 123b may enable transmission of RF signals in frequency bands utilized by WLAN and/or BT systems.

The processor 125 may comprise suitable logic, circuitry, and/or code that may enable control and/or data processing operations for the mobile terminal 120. The processor 125 may be utilized to control at least a portion of the WLAN/BT receiver 123a, the WLAN/BT transmitter 123b, the WLAN digital baseband processor 129a, BT digital baseband processor 129b, and/or the memory 127. In this regard, the processor 125 may generate at least one signal for controlling operations within the mobile terminal 120.

The memory 127 may comprise suitable logic, circuitry, and/or code that may enable storage of data and/or other information utilized by the mobile terminal 120. For example, the memory 127 may be utilized for storing processed data generated by the WLAN digital baseband processor 129a, BT digital baseband processor 129b and/or the processor 125. The memory 127 may also be utilized to store information, such as configuration information, that may be utilized to control the operation of at least one block in the mobile terminal 120. For example, the memory 127 may comprise information necessary to configure the WLAN/BT receiver 123a to enable receiving WLAN and/or BT signals in the appropriate frequency band.

Figure 2A:
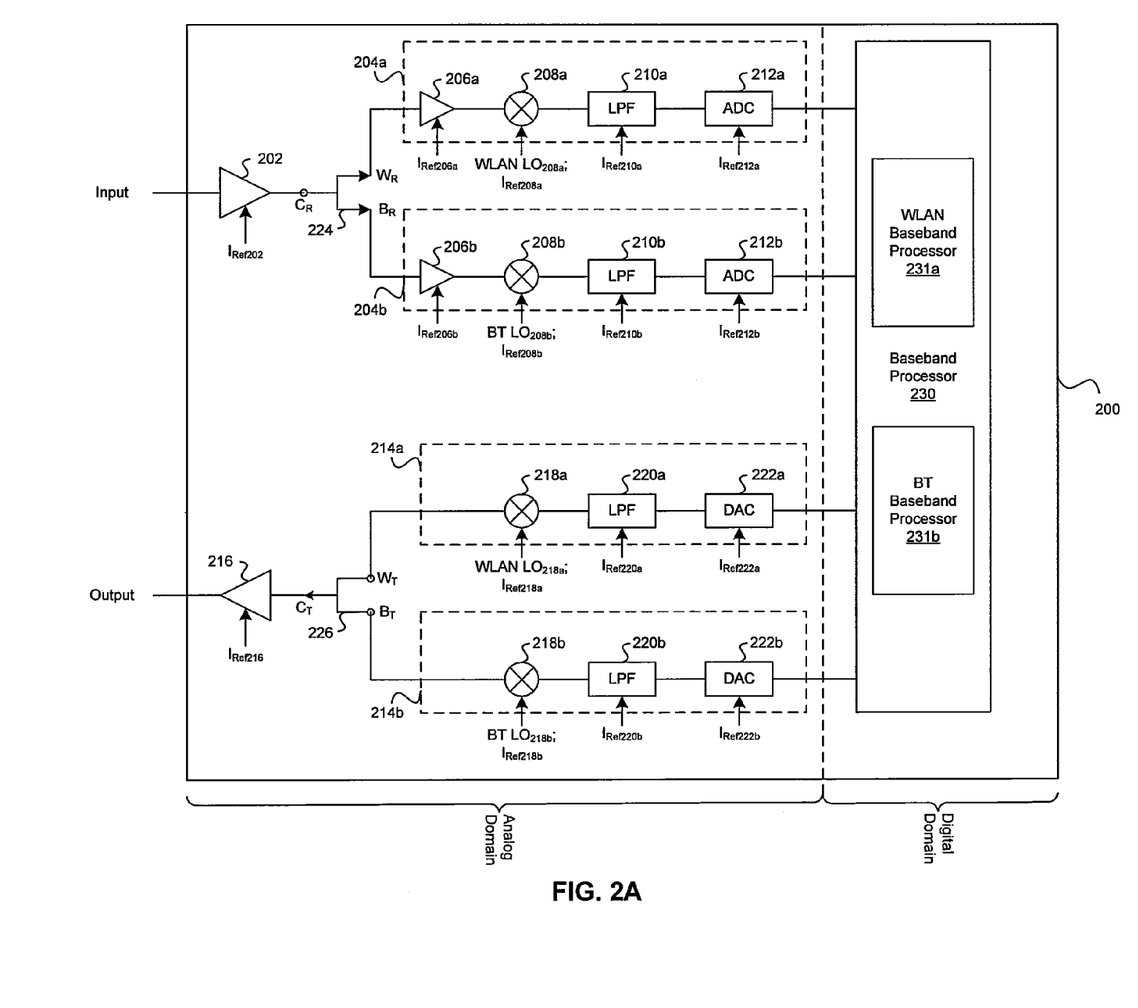
FIG. 2A is an exemplary block diagram illustrating shared low noise amplifier circuitry within single chip WLAN and Bluetooth radios on a single CMOS substrate, in accordance with an embodiment of the invention.

FIG. 2A is an exemplary block diagram illustrating shared low noise amplifier circuitry within single chip WLAN and Bluetooth radios on a single CMOS substrate, in accordance with an embodiment of the invention. Referring to FIG. 2A, there is shown a single chip WLAN and BT radio 200. The single chip WLAN and BT radio 200 may comprise a shared LNA 202, a WLAN receiver 204a, a BT receiver 204b, a shared power amplifier (PA) 216, a WLAN transmitter 214a, a BT transmitter 214b, power splitter 224, power combiner 226, and a baseband processor 230. The WLAN receiver 204a may comprise a WLAN LNA 206a, a WLAN mixer 208a, a low pass filter (LPF) 210a, and an ADC 212a. The BT receiver 204b may comprise a BT LNA 206b, a BT mixer 208b, a low pass filter (LPF) 210b, and an ADC 212b. The WLAN transmitter 214a may comprise a WLAN mixer 218a, a low pass filter (LPF) 220a, and a DAC 222a. The BT transmitter 214b may comprise a BT mixer 218b, a low pass filter (LPF) 220b, and a DAC 222b. The baseband processor 230 may comprise a WLAN baseband processor 231a and a BT baseband processor 231b.

The LNA 202 may comprise suitable logic, circuitry, and/or code that may enable amplification of weak signals (as measured by dBm, for example), such as received from an antenna. The LNA 202 receives a signal labeled as Input in FIG. 2A, and generates an output signal labeled as $C_R$ in FIG. 2A. The Input signal may be an RF signal received at an antenna, which may be communicatively coupled to the LNA 202. The LNA 202 may receive an input bias current labeled as $I_{Ref202}$ in FIG. 2A. The bias current level may be selected to enable linear operation of the LNA 202. In the linear range of operation, the amplitude of the output signal from the LNA 202 may be represented as a linear function of the amplitude of the input signal over a range of input signal amplitudes. The linear function may be based on the gain of the LNA 202 over at least a portion of the range of input signal amplitudes.

The WLAN receiver 204a may comprise suitable logic, circuitry, and/or code that may enable amplification, downconversion, filtering, and/or ADC processing of a received WLAN signal. The BT receiver 204b may comprise suitable logic, circuitry, and/or code that may enable amplification, downconversion, filtering, and/or ADC processing of a received BT signal.

The WLAN LNA 206a may be substantially similar to the LNA 202. The WLAN LNA 206a may receive an input bias current labeled as $I_{Ref206a}$ in FIG. 2A. The bias current level may be selected to enable linear operation of the WLAN LNA 206a.

The BT LNA 206b may be substantially similar to the LNA 202. The BT LNA 206b may receive an input bias current labeled as $I_{Ref206b}$ in FIG. 2A. The bias current level may be selected to enable linear operation of the BT LNA 206b.

The WLAN mixer 208a may comprise suitable logic, circuitry, and/or code that may enable downconversion of an input signal. The WLAN mixer 208a may utilize an input local oscillator signal labeled as WLAN $LO_{208a}$ (in FIG. 2A) to downconvert the input signal. The input signal may be an RF signal that is downconverted to generate a baseband signal, or an intermediate frequency (IF) signal. In general, the WLAN mixer 208a may produce signals for which the frequencies may be the sum and difference of the frequency of the input signal, the frequency of the signal WLAN $LO_{208a}$, and/or harmonic frequencies derived from the before mentioned signals. The WLAN mixer 208a may receive an input bias current labeled as $I_{Ref208a}$ in FIG. 2A. The bias current level may be selected to enable the downconversion operation of the WLAN mixer 208a.

The BT mixer 208b may be substantially similar to the WLAN mixer 208a. The BT mixer 208b may utilize an input local oscillator signal labeled as BT $LO_{208b}$ (in FIG. 2A) to downconvert the input signal. The BT mixer 208b may receive an input bias current labeled as $I_{Ref208b}$ in FIG. 2A. The bias current level may be selected to enable the downconversion operation of the BT mixer 208b.

The LPF 210a may comprise suitable logic, circuitry, and/or code that may enable selection of a cutoff frequency. The LPF 210a may enable attenuation of the amplitudes of input signal components for which the corresponding frequency is higher than the cutoff frequency, while the amplitudes of input signal components for which the corresponding frequency is less than the cutoff frequency may "pass," or not be attenuated, or attenuated to a lesser degree than input signal components at frequencies higher than the cutoff frequency. In various embodiments of the invention, the LPF 210a may be implemented as a passive filter, such as one that utilizes resistor, capacitor, and/or inductor elements, or implemented as an active filter, such as one that utilizes an operational amplifier. The LPF 210a may receive an input bias current labeled as $I_{Ref210a}$ in FIG. 2A. The bias current level may be selected to enable the filtering operation of the LPF 210a.

The LPF 210b may be substantially similar to the LPF 210a. The LPF 210b may receive an input bias current labeled as $I_{Ref210b}$ in FIG. 2A. The bias current level may be selected to enable the filtering operation of the LPF 210b.

The ADC 212a may comprise suitable logic, circuitry, and/or code that may enable conversion of an input analog signal to a corresponding digital representation. The ADC 212a may receive an input analog signal, characterized by a signal amplitude.

The ADC 212a may quantize the analog signal by correlating ranges of analog signal level values to corresponding numerical values. The ADC 212a may determine analog signal levels at distinct time instants by measuring, or integrating, the analog signal level of the input signal during a time interval referred to as δt. The time interval between measurements, or sampling interval, may be determined based on a sampling rate, which typically, may be long* in comparison to the integration time interval δt. The ADC 212a may receive an input bias current labeled as $I_{Ref212a}$ in FIG. 2A. The bias current level may be selected to enable the conversion operation of the ADC 212a.

The ADC 212b may be substantially similar to the ADC 212a. The ADC 212b may receive an input bias current labeled as $I_{Ref212b}$ in FIG. 2A. The bias current level may be selected to enable the conversion operation of the ADC 212b.

The power splitter 224 may comprise suitable logic, circuitry, and/or code that may enable an input signal to be coupled to a plurality of output points. In an exemplary embodiment of the invention, the power splitter 224 may receive a single input signal labeled $C_R$ in FIG. 2A, which may be coupled to two output points, which are labeled $B_R$ and $W_R$, respectively, in FIG. 2A.

The WLAN transmitter 214a may comprise suitable logic, circuitry, and/or code that may enable generation of a transmitted WLAN signal by DAC processing, filtering, and/or upconversion of an input baseband signal. The BT transmitter 214b may comprise suitable logic, circuitry, and/or code that may enable generation of a transmitted BT signal by DAC processing, filtering, and/or upconversion of an input baseband signal.

The DAC 222a may comprise suitable logic, circuitry, and/or code that may enable conversion of an input digital signal to a corresponding analog representation. The DAC 222a may receive an input bias current labeled as $I_{Ref222a}$ in FIG. 2A. The bias current level may be selected to enable the conversion operation of the DAC 222a.

The DAC 222b may be substantially similar to the DAC 222a. The DAC 222b may receive an input bias current labeled as $I_{Ref222b}$ in FIG. 2A. The bias current level may be selected to enable the conversion operation of the DAC 222b.

The LPF 220a may be substantially similar to the LPF 210a. The LPF 220a may receive an input bias current labeled as $I_{Ref220a}$ in FIG. 2A. The bias current level may be selected to enable the filtering operation of the LPF 220a.

The LPF 220b may be substantially similar to the LPF 210a. The LPF 220b may receive an input bias current labeled as $I_{Ref220b}$ in FIG. 2A. The bias current level may be selected to enable the filtering operation of the LPF 220b.

The WLAN mixer 218a may comprise suitable logic, circuitry, and/or code that may enable generation of a WLAN signal by upconversion of an input signal. The WLAN mixer 218a may utilize an input local oscillator signal labeled as WLAN $LO_{218a}$ to upconvert the input signal. The upconverted signal may be an RF signal. The WLAN mixer 218a may produce a WLAN RF signal for which the carrier frequency may be approximately equal to the frequency of the signal WLAN $LO_{218a}$. The WLAN mixer 218a may receive an input bias current labeled as $I_{Ref218a}$ in FIG. 2A. The bias current level may be selected to enable the upconversion operation of the WLAN mixer 218a.

The BT mixer 218b may be substantially similar to the WLAN mixer 218a. The BT mixer 218b may utilize an input local oscillator signal labeled as BT $LO_{218b}$ (in FIG. 2A) to upconvert the input signal. The BT mixer 218b may receive an input bias current labeled as $I_{Ref218b}$ in FIG. 2A. The bias current level may be selected to enable the downconversion operation of the WLAN mixer 218b.

The PA 216 may comprise suitable logic, circuitry, and/or code that may enable amplification of input signals to generate a transmitted signal of sufficient signal power (as measured by dBm, for example) for transmission via a wireless communication medium. The PA 216 receives an input signal labeled $C_T$ in FIG. 2A, and generates a signal labeled as Output in FIG. 2A. The Output signal may be an RF signal transmitted via an antenna, which is communicatively coupled to the PA 216. The PA 216 may receive an input bias current labeled as $I_{Ref216}$ in FIG. 2A. The bias current level may be selected to enable linear operation of the PA 216 over a range of input signal amplitudes. The linear operation may be based on the gain of the PA 216 over at least a portion of the range of input signal amplitudes.

The power combiner 226 may comprise suitable logic, circuitry, and/or code that may enable a plurality of input points to be coupled to an output point. In an exemplary embodiment of the invention, the power combiner 226 may enable a plurality of input signals, which are labeled $B_T$ and $W_T$, respectively, in FIG. 2A, to be coupled to a single output point, which is labeled $C_T$ in FIG. 2A.

The baseband processor 230 may comprise suitable logic, circuitry, and/or code that may enable processing of binary data contained within an input baseband signal. The baseband processor 230 may perform processing tasks, which correspond to one or more layers in an applicable protocol reference model (PRM). For example, the baseband processor 230 may perform physical (PHY) layer processing, layer 1 (L1) processing, medium access control (MAC) layer processing, logical link control (LLC) layer processing, layer 2 (L2) processing, and/or higher layer protocol processing based on input binary data. The processing tasks performed by the baseband processor 230 may be referred to as being within the digital domain. The baseband processor 230 may also generate control signals based on the processing of the input binary data. The WLAN baseband processor 231a may perform processing tasks related to the transmission and/or reception of WLAN signals, while the BT baseband processor 231b may perform processing tasks related to the transmission and/or reception of BT signals.

In operation, the LNA 202, WLAN receiver 204a, WLAN transmitter 214a, BT receiver 204b, BT transmitter 214b, and PA 216 may process analog signals, and may therefore be referred to as performing processing tasks in the analog domain.

The LNA 202 may receive an input RF signal Input, and generate an amplified signal that may be coupled, by the power splitter 224, to the point labeled $W_R$ in FIG. 2A. The LNA 202 may provide a first stage of amplification gain that may be suitable for either reception of WLAN signals and/or BT signals. The WLAN LNA 206a may amplify an input signal at the point labeled $W_R$ to provide a second stage of amplification gain that may be suitable for reception of WLAN signals. Similarly, the BT LNA 206b may amplify an input signal at the point labeled $B_R$ to provide a second stage of amplification gain that may be suitable for reception of BT signals.

The WLAN mixer 208a may utilize the input local oscillator signal WLAN $LO_{208a}$ to downconvert an input signal received from the WLAN LNA 206a. Similarly, the $B_T$ mixer 208b may utilize the input local oscillator signal BT $LO_{208b}$ to downconvert an input signal received from the BT LNA 206b. The LPF 210a may be configured to pass a frequency component of an input signal, received from the WLAN mixer 208a, for which the frequency is approximately equal to the difference between the frequency of the signal labeled Input, and the frequency of the signal WLAN $LO_{208a}$. The signal amplitudes of other frequency components in the input signal to the LPF 210a may be attenuated. The LPF 210b may similarly pass a frequency component of an input signal received from the BT mixer 208b, for which the frequency is approximately equal to the difference between the frequency of the signal labeled Input, and the frequency of the signal labeled BT $LO_{208b}$.

The ADC 212a may sample signal amplitudes in the analog input signal received from the LPF 210a, and generate a baseband signal that comprises bits generated based on conversion of the sampled signal amplitudes in the analog input signal. The ADC 212b may similarly generate a baseband signal from an analog input signal received from the LPF 210b. The WLAN baseband processor 231a may perform processing on the bits contained in the input baseband signal received from the ADC 212a, while the BT baseband processor 231b may perform processing on the bits contained in the input baseband signal received from the ADC 212b.

The WLAN baseband processor 231a may generate a baseband signal comprising bits that may be communicated to the DAC 222a, while the BT baseband processor 231b may generate a baseband signal comprising bits that may be communicated to the DAC 222b. The DAC 222a may generate an analog signal, which comprises one or more signal levels based on input bits received from the baseband processor 230. The DAC 222b may similarly generate an analog signal based on input bits received from the baseband processor 230. The analog signal generated by the DAC 222a may comprise a plurality of undesirable high frequency components. The signal amplitudes of these undesirable frequency components may be attenuated by the LPF 220a. Similarly, signal amplitudes associated with undesirable frequency components in the analog signal generated by the DAC 222b may be attenuated by the LPF 220b.

The WLAN mixer 218a may generate an RF WLAN signal by upconverting the input signal received from the LPF 220a with a carrier signal based on the input local oscillator signal WLAN $LO_{218a}$. Similarly, the BT mixer 218b may generate an RF BT signal by upconverting the input signal received from the LPF 220b with a carrier signal based on the input local oscillator signal WLAN $LO_{218b}$.

The power combiner 226 may couple a signal from the WLAN mixer 218a at the point labeled $W_T$ in FIG. 2A, to the input to the PA 216 at the point labeled $C_T$ in FIG. 2A. The PA 216 may provide suitable amplification of the power level of the input signal for transmission of the signal labeled Output via a wireless communication medium. The power combiner 226 may also couple a signal from the BT mixer 218b at the point labeled BT in FIG. 2A, to the input of the PA 216 at the point labeled $C_T$ in FIG. 2A.

The baseband processor 230 may generate control signals that control subsequent operation of the WLAN receiver 204a, and/or the BT receiver 204b. For example, the WLAN baseband processor 231a may generate control signals that select a frequency for the input local oscillator signal WLAN $LO_{208a}$, while the BT baseband processor 231b may generate control signals that select a frequency for the input local oscillator signal BT $LO_{208b}$. The baseband processor 230 may also generate control signals that control subsequent operation of the WLAN transmitter 214a, and/or the BT transmitter 214b. For example, the WLAN baseband processor 231a may generate control signals that select a frequency for the input local oscillator signal WLAN $LO_{218a}$, while the BT baseband processor 231b may generate control signals that select a frequency for the input local oscillator signal BT $LO_{218b}$.

In various embodiments of the invention, the integration of the WLAN receiver 204a and BT receiver 204b in a single chip CMOS substrate may enable a single LNA 202 circuit to be utilized for reception of both WLAN signals and BT signals. Similarly, the integration of the WLAN transmitter 214a and BT receiver 214b in a single chip CMOS substrate may enable a single PA 216 circuit to be utilized for transmission of both WLAN signals and BT signals.

Figure 2B:
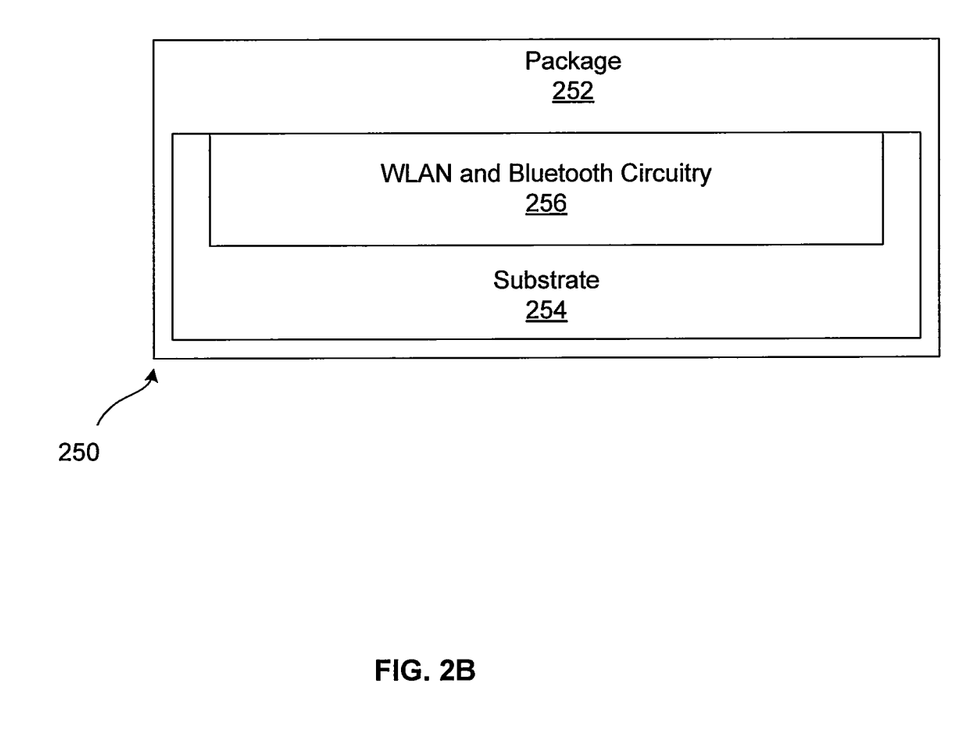
FIG. 2B is an illustration of exemplary WLAN and Bluetooth circuitry on a single substrate, in accordance with an embodiment of the invention.

FIG. 2B is an illustration of exemplary WLAN and Bluetooth circuitry on a single substrate, in accordance with an embodiment of the invention. Referring to FIG. 2B, there is shown a single chip WLAN and BT radio 250. The single chip WLAN and BT radio 250 may comprise a package 252. The package 252 may comprise a substrate 254. The substrate 254 may comprise WLAN and BT circuitry 256 integrated into the substrate 254 by a semiconductor fabrication process such as CMOS.

Figure 3:
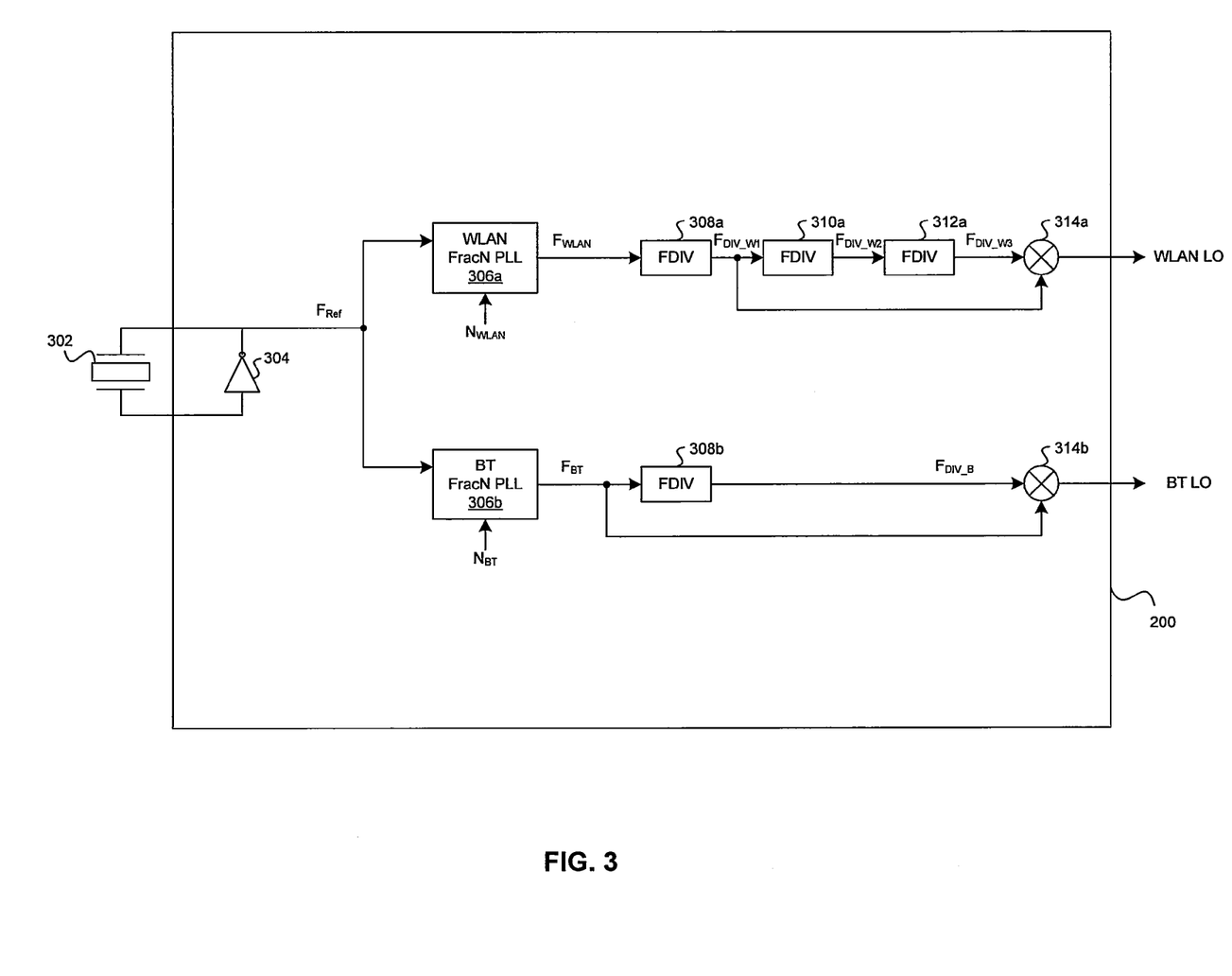
FIG. 3 is an exemplary block diagram illustrating shared crystal oscillator circuitry within single chip WLAN and Bluetooth radios on a single CMOS substrate, in accordance with an embodiment of the invention.

FIG. 3 is an exemplary block diagram illustrating shared crystal oscillator circuitry within single chip WLAN and Bluetooth radios on a single CMOS substrate, in accordance with an embodiment of the invention. FIG. 3 describes exemplary circuitry for generation of input local oscillator signals WLAN $LO_{208a}$, WLAN $LO_{218a}$, BT $LO_{208b}$, and BT $LO_{218b}$. Referring to FIG. 3, there is shown the single chip WLAN and BT radio 200 (FIG. 2A), and an XO 302. The single chip WLAN and BT radio 200 may comprise a buffer 304, a WLAN fractional-N phase locked loop (FracN PLL) 306a, a BT FracN PLL 306b, a plurality of frequency divider (FDIV) blocks 308a, 308b, 310a, and 312a, a plurality of mixer blocks 314a, and 314b.

The XO 302 may comprise suitable logic, circuitry, and/or code that may enable a crystal of piezoelectric material to resonate at a frequency within a determined frequency range in response to an applied voltage. In the exemplary block diagram illustrated in FIG. 3, the XO 302 may represent a source, which generates a reference signal for which the frequency may be represented $F_{Ref}$.

The buffer 304 may comprise suitable logic, circuitry, and/or code that may enable connection of a high impedance source to a low impedance load without significant attenuation, and/or distortion of the signal generated by the source.

The WLAN FracN PLL 306a may comprise suitable logic, circuitry, and/or code that may enable generation of an output signal, for which the frequency may be represented as $F_{WLAN}$. The output signal may be generated based on an input signal, for which the frequency may be represented as $F_{Ref}$, and an input divisor $N_{WLAN}$. The input divisor $N_{WLAN}$ may comprise an integer portion and/or fractional portion. The relationship between the frequencies $F_{Ref}$ and $F_{WLAN}$ may be represented as shown in the following equation:

$$F_{WLAN} \cong \frac{F_{Ref}}{N_{WLAN}} \quad [1]$$

In an exemplary embodiment of the invention, the frequency represented by $F_{WLAN}$ may be approximately 4 GHz.

The BT FracN PLL 306b may be substantially similar to the WLAN FracN PLL 306b. The BT FracN PLL 306b may enable generation of an output signal, for which the frequency may be represented $F_{BT}$, based on the input signal represented $F_{Ref}$, and an input divisor $N_{BT}$. The input divisor $N_{BT}$ may comprise an integer portion and/or fractional portion. The relationship between the frequencies $F_{Ref}$ and $F_{BT}$ may be represented as shown in the following equation:

$$F_{BT} \cong \frac{F_{Ref}}{N_{BT}} \quad [2]$$

In an exemplary embodiment of the invention, the frequency represented by $F_{WLAN}$ may be approximately 1.6 GHz.

The FDIV block 308a may comprise suitable logic, circuitry, and/or code that may enable generation of an output signal, for which the frequency, $F_{out}$, is a determined fraction of the frequency of a received input signal, $F_{in}$. In an exemplary embodiment of the invention the FDIV block 308a the frequency $F_{out}$ may be related to the frequency, $F_{in}$, as shown in the following equation:

$$F_{out} \cong \frac{F_{in}}{2} \quad [3]$$

The FDIV blocks 308b, 310a, and 312a may be substantially similar to the FDIV block 308a. The mixer blocks 314a and 314b may be substantially similar to the WLAN mixer block 208a.

The mixer block 314a may generate an output signal labeled WLAN LO in FIG. 3 by utilizing a first input signal, for which the frequency may be represented as $F_{DIV\_W1}$, and a second input signal, for which the frequency may be represented $F_{DIV\_W3}$. The output signal WLAN LO may comprise a frequency component for which the frequency may be approximately equal to the sum of the frequencies $F_{DIV\_W1}$ and $F_{DIV\_W3}$.

The mixer block 314b may generate an output signal labeled BT LO in FIG. 3 by utilizing a first input signal, for which the frequency may be represented $F_{BT}$, and a second input signal, for which the frequency may be represented as $F_{DIV\_BT}$. The output signal BT LO may comprise a frequency component for which the frequency may be approximately equal to the sum of the frequencies $F_{BT}$ and $F_{DIV\_BT}$.

In operation, the frequencies $F_{WLAN}$ and $F_{BT}$ may be selected to enable sufficient frequency spacing to avoid the occurrence of frequency pulling where there may be a tendency for the frequency value $F_{BT}$ to be adjusted, or pulled, toward the frequency value $F_{WLAN}$, or vice versa. The XO 302 and buffer 304 may generate a reference signal for which the frequency may be represented $F_{Ref}$. The reference signal may be communicated to the WLAN FracN PLL 306a, and the BT FracN PLL 306b.

The WLAN FracN PLL 306a may generate an output signal for which the frequency, $F_{WLAN}$, may be as shown in equation [1]. In an exemplary embodiment of the invention, based on the reference signal frequency, $F_{Ref}$, the divisor value $N_{WLAN}$ may be selected such that the value of the frequency, $F_{WLAN}$, may be slightly less than 4 GHz. The FDIV block 308a may receive an input signal from the WLAN FracN PLL 306a, and generate an output signal, for which the frequency may be represented $F_{DIV\_W1}$. In an exemplary embodiment of the invention, the value of the frequency, $F_{DIV\_W1}$, may be slightly less than 2 GHz. The FDIV block 310a may receive an input signal from the FDIV block 308a, and generate an output signal, for which the frequency may be represented as $FDIV\_W2$. In an exemplary embodiment of the invention, the value of the frequency, $F_{DIV\_W2}$, may be slightly less than 1 GHz. The FDIV block 312a may receive an input signal from the FDIV block 310a, and generate an output signal, for which the frequency may be represented as $F_{DIV\_W3}$. In an exemplary embodiment of the invention, the value of the frequency, $F_{DIV\_W3}$, may be slightly less than 500 MHz. The mixer block 314a may receive an input signal from the FDIV block 308a and an input signal from the FDIV block 312a. Based on these input signals, the mixer block 314a may generate an output signal WLAN LO. In an exemplary embodiment of the invention, the value of the frequency of the output signal WLAN LO may be approximately equal to 2.4 GHz. The output signal WLAN LO may be utilized as an input local oscillator signal WLAN $LO_{208a}$, and/or input local oscillator signal WLAN $LO_{218a}$.

The BT FracN PLL 306b may generate an output signal for which the frequency, $F_{BT}$, may be as shown in equation [2]. In an exemplary embodiment of the invention, based on the reference signal frequency, $F_{Ref}$, the divisor value $N_{BT}$ may be selected such that the value of the frequency, $F_{BT}$, may be approximately equal to 1.6 GHz. The FDIV block 308b may receive an input signal from the BT FracN PLL 306b, and generate an output signal, for which the frequency may be represented as $F_{DIV\_B}$. In an exemplary embodiment of the invention, the value of the frequency, $F_{DIV\_B}$, may be approximately equal to 800 MHz. The mixer block 314b may receive an input signal from the BT FracN PLL 306b and an input signal from the FDIV block 308b. Based on these input signals, the mixer block 314b may generate an output signal BT LO. In an exemplary embodiment of the invention, the value of the frequency of the output signal BT LO may be approximately equal to 2.4 GHz. The output signal BT LO may be utilized as an input local oscillator signal BT $LO_{208b}$, and/or input local oscillator signal BT $LO_{218b}$.

In various embodiments of the invention, the integration of the WLAN receiver 204a and WLAN transmitter 214a, and BT receiver 204b and BT transmitter 214b, in a single chip CMOS substrate may enable a single XO 302 to be utilized for generation of both WLAN LO signals and BT LO signals.

Figure 4A:
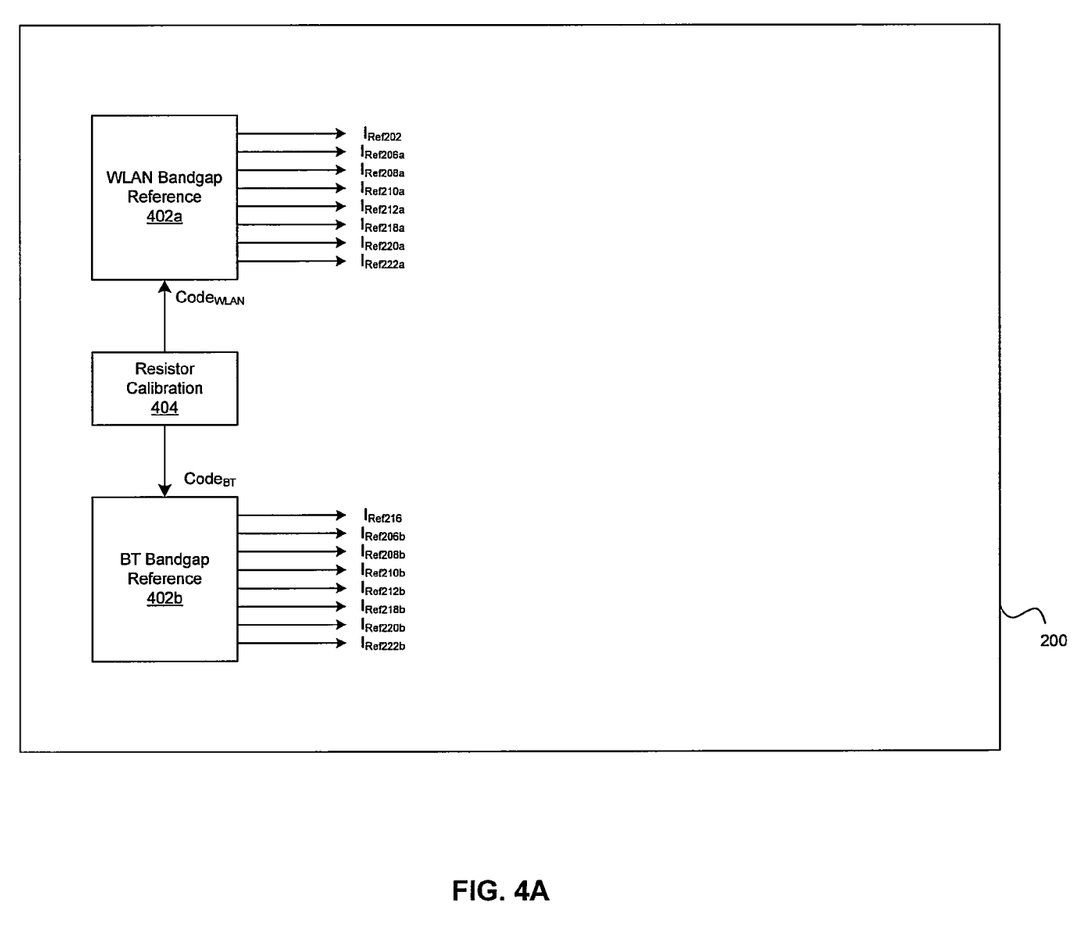
FIG. 4A is an exemplary block diagram illustrating shared bias current calibration circuitry within single chip WLAN and Bluetooth radios on a single CMOS substrate, in accordance with an embodiment of the invention.

FIG. 4A is an exemplary block diagram illustrating shared bias current calibration circuitry within single chip WLAN and Bluetooth radios on a single CMOS substrate, in accordance with an embodiment of the invention. FIG. 4A describes circuitry, which enables generation of input bias currents $I_{Ref206a}$, $I_{Ref208a}$, $I_{Ref210a}$, $I_{Ref212a}$, $I_{Ref218a}$, $I_{Ref220a}$, and $I_{Ref222a}$ in the WLAN receiver 204a and WLAN transmitter 214a. FIG. 4A further describes circuitry, which enables generation of input bias currents $I_{Ref206b}$, $I_{Ref208b}$, $I_{Ref210b}$, $I_{Ref212b}$, $I_{Ref218b}$, $I_{Ref220b}$, and $I_{Ref222b}$ in the BT receiver 204b and BT transmitter 214b. FIG. 4A also describes circuitry, which enables generation of input bias currents $I_{Ref202}$, and $I_{Ref216}$. Referring to FIG. 4A, there is shown the single chip WLAN and BT radio 200. The single chip WLAN and BT radio may comprise a WLAN bandgap reference circuit 402a, a BT bandgap reference circuit 402b, and a resistor calibration (RCAL) circuit 404.

The WLAN bandgap reference circuit 402a may comprise suitable logic, circuitry, and/or code that may enable generation of a current, for which the amplitude may be substantially independent of operating temperature variations. The WLAN bandgap reference circuit 402a may generate a plurality of input bias currents for the WLAN receiver 204a and/or WLAN transmitter 214a. The input bias currents may comprise $I_{Ref206a}$, $I_{Ref208a}$, $I_{Ref210a}$, $I_{Ref212a}$, $I_{Ref218a}$, $I_{Ref220a}$, and $I_{Ref222a}$ (FIG. 2A). An exemplary WLAN bandgap reference circuit 402a may also generate an input bias current $I_{Ref202}$.

The BT bandgap reference circuit 402b may be substantially similar to the WLAN bandgap reference circuit 402a. The BT bandgap reference circuit 402b may generate a plurality of input bias currents for the BT receiver 204b and/or BT transmitter 214b. The input bias currents may comprise $I_{Ref206b}$, $I_{Ref208b}$, $I_{Ref210b}$, $I_{Ref212b}$, $I_{Ref218b}$, $I_{Ref220b}$, and $I_{Ref222b}$ (FIG. 2A). An exemplary BT bandgap reference circuit 402b may also generate input bias current $I_{Ref216}$.

In other exemplary embodiments of the invention, the input bias currents $I_{Ref202}$ and/or $I_{Ref216}$ may both be generated by the WLAN bandgap reference circuit 402a, or by the BT bandgap reference circuit 402b, or by one or more separate bandgap reference circuits.

The RCAL circuit 404 may comprise suitable logic, circuitry, and/or code that may enable generation of one or more codes, labeled $Code_{WLAN}$, and $Code_{BT}$ in FIG. 4A. The RCAL circuit 404 may generate the one or more codes by comparing a voltage induced by an input current across an internal variable resistor, $R_{On\_Chip}$, to a voltage induced by the input current across an external calibration resistor, $R_{Off\_Chip}$. By adjusting the value of the internal variable resistor to equilibrate the comparative voltages, the RCAL circuit 404 may generate at least one code for each received input current.

In operation, the RCAL circuit 404 may comprise circuitry that enables generation of the code labeled $Code_{WLAN}$. The RCAL circuit 404 may utilize one or more of the bias currents generated by the WLAN bandgap reference circuit 402a, or one or more of the bias currents generated by the BT bandgap reference circuit 402b, as a feedback input current for generation of the code $Code_{WLAN}$. The code $Code_{WLAN}$ may be communicated to the WLAN bandgap reference circuit 402a. Based on the received code $Code_{WLAN}$ the WLAN bandgap reference circuit 402a may select current levels for input bias currents $I_{Ref206a}$, $I_{Ref208a}$, $I_{Ref210a}$, $I_{Ref212a}$, $I_{Ref218a}$, $I_{Ref220a}$, and $I_{Ref222a}$. The WLAN bandgap reference circuit 402a may also select a current level for the input bias current $I_{Ref202}$.

The RCAL circuit 404 may also comprise circuitry that enables generation of the code labeled $Code_{BT}$. The RCAL circuit 404 may utilize one or more of the bias currents generated by the WLAN bandgap reference circuit 402a, or one or more of the bias currents generated by the BT bandgap reference circuit 402b, as a feedback input current for generation of the code $Code_{BT}$. The code $Code_{BT}$ may be communicated to the BT bandgap reference circuit 402b. Based on the received code $Code_{BT}$ the BT bandgap reference circuit 402b may select current levels for input bias currents $I_{Ref206b}$, $I_{Ref208b}$, $I_{Ref210b}$, $I_{Ref212b}$, $I_{Ref218b}$, $I_{Ref220b}$, and $I_{Ref222b}$. The BT bandgap reference circuit 402b may also select a current level for the input bias current $I_{Ref216}$.

In various embodiments of the invention, the integration of the WLAN receiver 204a and WLAN transmitter 214a, and BT receiver 204b and BT transmitter 214b, in a single chip CMOS substrate may enable a single RCAL 404 circuit to be utilized for generation of the code $Code_{WLAN}$, and for generation of the code $Code_{BT}$. In this regard, the RCAL 404 circuit may utilize one or more currents generated by the WLAN bandgap reference circuit 402a, for generation of both the codes $Code_{WLAN}$ and $Code_{BT}$. Alternatively, the RCAL 404 circuit may utilize one or more currents generated by the BT bandgap reference circuit 402b, for generation of both the codes $Code_{WLAN}$ and $Code_{BT}$.

Figure 4B:
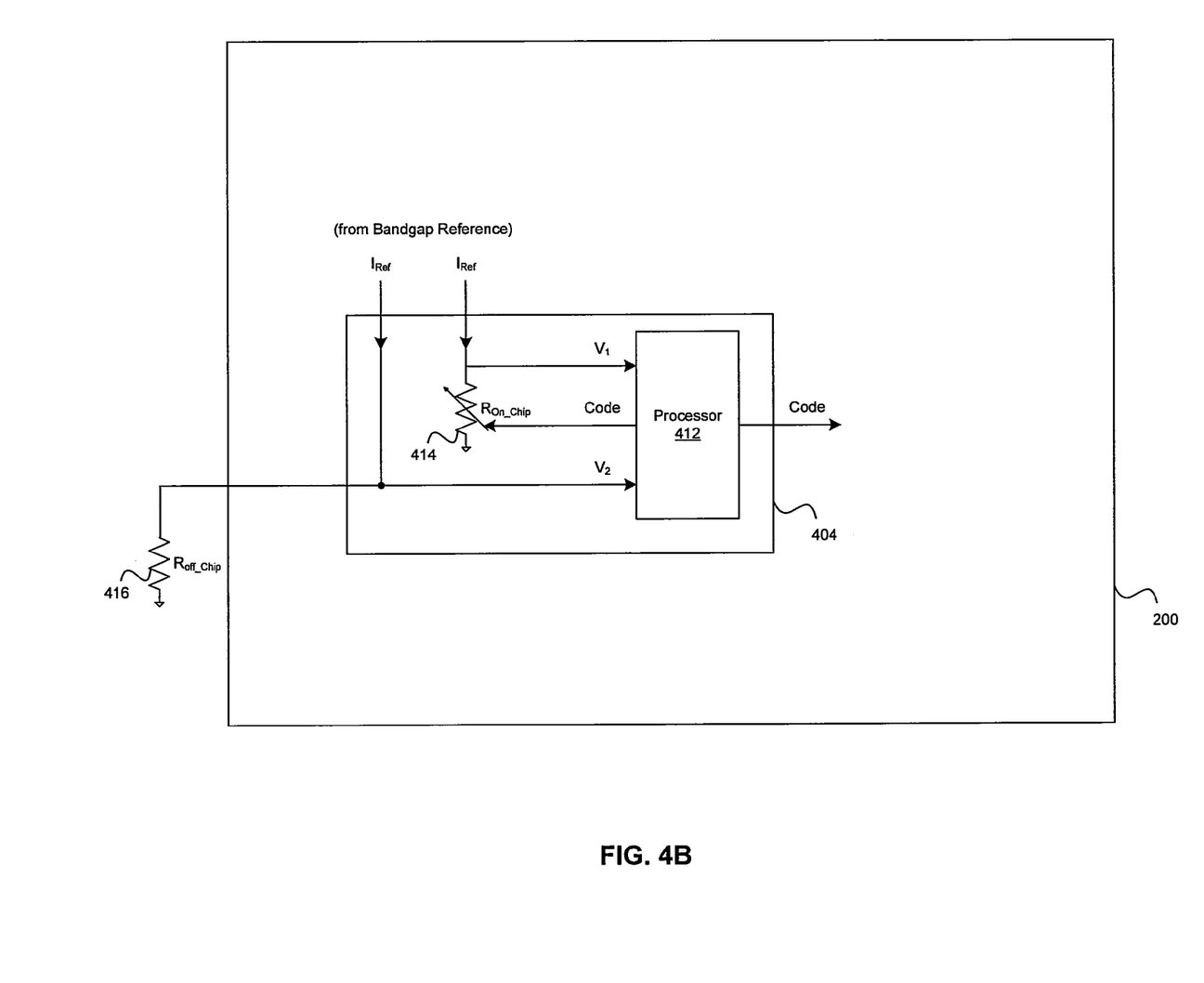
FIG. 4B is a block diagram illustrating exemplary resistor calibration circuitry within single chip WLAN and Bluetooth radios on a single CMOS substrate, in accordance with an embodiment of the invention.

FIG. 4B is a block diagram illustrating exemplary resistor calibration circuitry within single chip WLAN and Bluetooth radios on a single CMOS substrate, in accordance with an embodiment of the invention. Referring to FIG. 4B, there is shown the single chip WLAN and BT radio 200, and an external calibration resistor, $R_{Off\_Chip}$ 416. The single chip WLAN and BT radio 200 may comprise an RCAL circuit 404. The RCAL circuit 404 may comprise a processor 412, and an on chip variable resistor $R_{On\_Chip}$ 414.

In operation, the RCAL circuit 404 may receive an input current, $I_{Ref}$, which may be generated by either the WLAN bandgap reference circuit 402a, or the BT bandgap reference circuit 402b. The input current $I_{Ref}$ may be utilized by the RCAL circuit 404 to measure an induced voltage, $V_1$, across the variable resistor $R_{On\_Chip}$ 414. The input current may also be utilized by the RCAL circuit 404 to measure an induced voltage, $V_2$, across the external calibration resistor, $R_{Off\_Chip}$ 416. The processor 412 may compare the values for the voltage levels $V_1$ and $V_2$, and adjust the resistance value for the variable resistor $R_{On\_Chip}$ 414 until the voltage level $V_1$ is approximately equal to the voltage level $V_2$. The output from the RCAL circuit 404, labeled Code in FIG. 4B, may be communicated to the WLAN bandgap reference circuit 402a, and to the BT bandgap reference circuit 402b.

In an exemplary embodiment of the invention, the code labeled $Code_{WLAN}$ (FIG. 4A) may be equal to the code labeled $Code_{BT}$ (FIG. 4A). The code labeled $Code_{WLAN}$ (FIG. 4A) and the code labeled $Code_{BT}$ (FIG. 4A) may each be equal to the code labeled Code in FIG. 4B. However, the invention may also be practiced when the RCAL circuit 404 generates a code labeled $Code_{WLAN}$ which may not be equal to the code labeled $Code_{BT}$.

Figure 5:
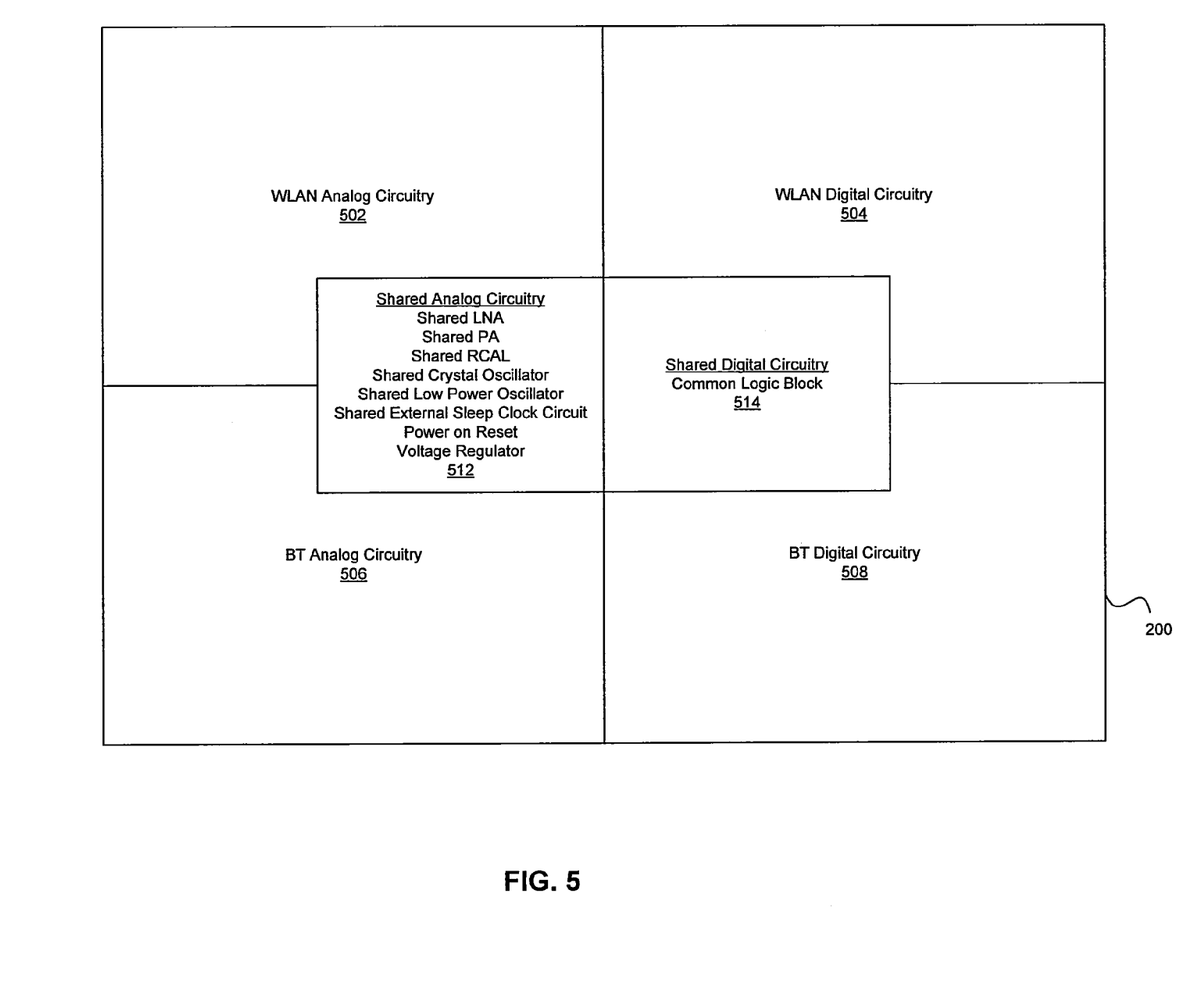
FIG. 5 is a block diagram illustrating exemplary shared circuitry within single chip WLAN and Bluetooth radios on a single CMOS substrate, in accordance with an embodiment of the invention.

FIG. 5 is a block diagram illustrating exemplary shared circuitry within single chip WLAN and Bluetooth radios on a single CMOS substrate, in accordance with an embodiment of the invention. FIG. 5 provides a summary of circuitry that may be shared for reception, transmission and/or processing of both WLAN and BT signals. Referring to FIG. 5, there is shown the single chip WLAN and BT radio 200. The single chip WLAN and BT radio 200 may comprise WLAN analog circuitry 502, WLAN digital circuitry 504, BT analog circuitry 506, BT digital circuitry 508, shared analog circuitry 512, and shared digital circuitry 514.

The WLAN analog circuitry 502 and BT analog circuitry 506 may comprise circuitry that performs processing tasks on signals in the analog domain. The WLAN digital circuitry 504 and BT digital circuitry 508 may comprise circuitry that performs processing tasks on signals in the digital domain. The shared analog circuitry 512 may comprise circuitry that may be utilized by either or both the WLAN analog circuitry 502 and/or BT analog circuitry 506, and/or by both the WLAN digital circuitry 504 and/or BT digital circuitry 508. The shared digital circuitry 514 may comprise circuitry that may be utilized by either or both the WLAN digital circuitry 504 and/or BT digital circuitry 508.

The shared analog circuitry 512 may comprise shared LNA circuitry 202, shared PA circuitry 216, shared RCAL circuitry 404, shared crystal oscillator 302, shared low power oscillator (LPO) circuitry, shared external sleep clock circuitry, power on reset and voltage regulator circuitry. An LPO may be utilized to generate predictable and stable system timing signals when the single chip WLAN and BT radio 200 is in a low power operating mode, or "sleep" mode. The single chip WLAN and BT radio 200 may also utilize an external sleep clock signal, which may be generated by external sleep clock circuitry, such as an XO circuit. In various embodiments of the invention, the integration of the WLAN receiver 204a and WLAN transmitter 214a, and BT receiver 204b and BT transmitter 214b in a single chip, may enable a single LPO circuit to be utilized to generate system timing signals for both WLAN signal processing and BT signal processing when the single chip WLAN and BT radio 200 is in sleep mode. Similarly, a single external sleep clock circuit may be utilized for generating system timing signals for both WLAN and BT circuitry when the single chip WLAN and BT radio 200 is in sleep mode. Furthermore, common logic block circuitry may be utilized in the baseband processor 230, for example, for processing baseband signals derived from received WLAN signals, and/or for processing baseband signals derived from received BT signals. The baseband processor 230 may also comprise common logic blocks, which may be utilized to generate control signals for both WLAN receiver 204a and/or WLAN transmitter 214a circuitry, and/or for BT receiver 204b and/or BT transmitter 214b circuitry. The common logic blocks may also generate control signals within the digital domain, which may control WLAN processing and/or BT processing within the digital domain.

Various embodiments of the invention may also be practiced when additional radios are integrated into a single chip CMOS substrate to support additional wireless communication services. For example, various embodiments of the invention as set forth above may also be practiced when the single chip CMOS substrate comprises a WLAN radio, a BT radio, and a GSM radio, for example.

Various embodiments of the invention may also be practiced when utilizing IC fabrication technologies other than CMOS, for example, BiCMOS, NMOS, and PMOS.

Aspects of the system may include a WLAN receiver circuit 204a within a substrate of a single chip 200 that enables reception of WLAN signals, and a Bluetooth receiver circuit 204b within the same substrate that enables reception of Bluetooth signals. The WLAN receiver circuit 204a and BT receiver circuit 204b may utilize a single low noise amplifier circuit 202 that enables reception of the WLAN signals and BT signals.

The WLAN receiver circuit 204a may enable reception of WLAN signals by coupling an output from the single LNA circuit 202 to an input of the WLAN receiver circuit 204a. The WLAN receiver circuit 204a may enable reception of the WLAN signals by downconverting the received WLAN signals by a WLAN LO signal, wherein a frequency for the WLAN LO signal may be selected from a WLAN frequency band.

A single XO 302 may enable generation of the WLAN LO signal and a BT LO signal. A WLAN PLL circuit 306a may enable generation of a VCO signal based on a signal generated by the single XO 302 and a WLAN divisor input value, wherein the WLAN divisor input value may comprise an integer and/or fraction. One or more frequency divider circuits 308a and one or more mixer circuits 314a may enable generation of the WLAN LO signal based on the generated VCO signal.

The BT receiver circuit 204b may enable reception of BT signals by coupling an output from the single LNA circuit 202 to an input of the BT receiver circuit 204b. The BT receiver circuit 204b may enable reception of the BT signals by downconverting the received BT signals by a BT LO signal, wherein a frequency for the BT LO signal may be selected from a BT frequency band.

A single XO 302 may enable generation of the BT LO signal and a WLAN LO signal. A BT PLL circuit 306b may enable generation of a VCO signal based on a signal generated by the single XO 302 and a BT divisor input value, wherein the BT divisor input value may comprise an integer and/or fraction. One or more frequency divider circuits 308b and one or more mixer circuits 314b may enable generation of the BT LO signal based on the generated VCO signal.

Aspects of the system may also include a WLAN transmitter circuit 214a within a substrate of a single chip that enables transmission of WLAN signals, and a Bluetooth transmitter circuit 214b within the same substrate that enables transmission of Bluetooth signals. The WLAN transmitter circuit 214a and Bluetooth transmitter circuit 214b may utilize a single power amplifier circuit 216 that enables transmission of the WLAN signals and Bluetooth signals.

The WLAN transmitter circuit 214a may enable transmission of WLAN signals by coupling an output from the WLAN transmitter circuit 214a to an input of the PA circuit 216. The WLAN transmitter circuit 214a may enable transmission of the WLAN signals by upconverting an input signal derived from a baseband signal by a WLAN LO signal, wherein a frequency for the WLAN LO signal may be selected from a WLAN frequency band.

A single XO 302 may enable generation of the WLAN LO signal and a BT LO signal. A WLAN PLL circuit 306a may enable generation of a VCO signal based on a signal generated by the single XO 302 and a WLAN divisor input value, wherein the WLAN divisor input value may comprise an integer and/or fraction. One or more frequency divider circuits 308a and one or more mixer circuits 314a may enable generation of the WLAN LO signal based on the generated VCO signal.

The BT transmitter circuit 214b may enable transmission of BT signals by coupling an output from the BT transmitter circuit 214b to an input of the PA circuit 216. The BT transmitter circuit 214b may enable transmission of the BT signals by upconverting an input signal derived from a baseband signal by a BT LO signal, wherein a frequency for the BT LO signal may be selected from a BT frequency band.

A single XO 302 may enable generation of the BT LO signal and a WLAN LO signal. A BT PLL circuit 306b may enable generation of a VCO signal based on a signal generated by the single XO 302 and a BT divisor input value, wherein the BT divisor input value may comprise an integer and/or fraction. One or more frequency divider circuits 308b and one or more mixer circuits 314b may enable generation of the BT LO signal based on the generated VCO signal.

Aspects of a system for transmitting and/or receiving signals via a wireless communications medium may comprise at least one circuit within a substrate of a single chip that enables generation of a WLAN LO signal and a Bluetooth LO signal from an input signal received from a single crystal oscillator circuit.

Aspects of a system for transmitting and/or receiving signals via a wireless communications medium may comprise a WLAN bandgap reference circuit and a Bluetooth bandgap reference circuit within a substrate of a single chip.

Aspects of a system for transmitting and/or receiving signals via a wireless communications medium may comprise a LPO circuit within a substrate of a single chip that enables generation of system timing signals for a WLAN receiver, WLAN transmitter, a Bluetooth receiver and a Bluetooth transmitter.

Aspects of a system for transmitting and/or receiving signals via a wireless communications medium may comprise a single chip IC on a single substrate that comprises: an LPO circuit that enables generation of system timing signals for a WLAN receiver, WLAN transmitter, a Bluetooth receiver and a Bluetooth transmitter; a WLAN bandgap reference circuit and a Bluetooth bandgap reference circuit; circuitry that enables generation of a WLAN LO signal and a Bluetooth LO signal from an input signal received from a single crystal oscillator circuit; a LNA circuit that enables reception of WLAN signals and reception of Bluetooth signals; a PA circuit that enables transmission of WLAN signals and transmission of Bluetooth signals; and/or a resistor calibration circuit that enables generation of at least one codeword based on at least one bias current received from the WLAN bandgap reference circuit and/or the Bluetooth bandgap reference circuit.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for configuring circuitry, the system comprising:
   a resistor calibration circuit that enables generation of a plurality of distinct codewords comprising a first codeword and a second codeword based on at least one bias current received from a wireless local area network bandgap reference circuit and a Bluetooth bandgap reference circuit;
   a wireless local area network bandgap reference circuit that enables generation of at least one wireless local area network bias current signal based on said first of said generated plurality of distinct codewords from said resistor calibration circuit; and
   a Bluetooth bandgap reference circuit that enables generation of at least one Bluetooth bias current signal based on said second of said generated plurality of distinct codewords from said resistor calibration circuit, wherein said resistor calibration circuit is shared with said wireless local area network bandgap reference circuit,
   wherein said wireless local area network bandgap reference circuit, said Bluetooth bandgap reference circuit, and said resistor calibration circuit are integrated on a single chip having a wireless local area network and a Bluetooth radio.

2. The system according to claim 1, wherein said at least one wireless local area network bias current signal enables reception of wireless local area signals via at least one wireless local area network receiver circuit within a substrate of said single chip.

3. The system according to claim 1, wherein said at least one Bluetooth bias current signal enables reception of Bluetooth signals via at least one Bluetooth receiver circuit within said substrate of said single chip.

4. The system according to claim 1, wherein said resistor calibration circuit enables measurement of a voltage induced across a variable resistor within a substrate of said single chip based on said at least one bias current.

5. The system according to claim 4, wherein said resistor calibration circuit enables adjustment of a resistive value for said variable resistor based on a comparison of said voltage induced across said variable resistor and a voltage induced across a calibration resistor based on said at least one bias current.

6. The system according to claim 5, wherein said resistor calibration circuit enables said generation of said generated plurality of distinct codewords based on said adjustment of said resistive value for said variable resistor.

7. The system according to claim 1, wherein said first of said generated plurality of distinct codewords and said second of said generated plurality of distinct codewords are the same codeword.

8. The system according to claim 1, wherein said resistor calibration circuit enables selection of a distinct codeword from said generated plurality of distinct codewords to be said first of said generated plurality of distinct codewords.

9. The system according to claim 1, wherein said resistor calibration circuit enables selection of a distinct codeword from said generated plurality of distinct codewords to be said second of said generated plurality of distinct codewords.

10. A method for configuring circuitry, the method comprising:
enabling, by a resistor calibration circuit, generation of a plurality of distinct codewords comprising a first codeword and a second codeword based on at least one bias current received from a wireless local area network bandgap reference circuit and a Bluetooth bandgap reference circuit;
enabling, by a wireless local area network bandgap reference circuit, generation of at least one wireless local area network bias current signal based on said first of said generated plurality of distinct codewords from said resistor calibration circuit; and
enabling, by a Bluetooth bandgap reference circuit, generation of at least one Bluetooth bias current signal based on said second of said generated plurality of distinct codewords from said resistor calibration circuit, wherein said resistor calibration circuit is shared with said wireless local area network bandqap reference circuit,
wherein said wireless local area network bandgap reference circuit, said Bluetooth bandgap reference circuit, and said resistor calibration circuit are co-located on a single chip having a wireless local area network and a Bluetooth radio.

11. The method according to claim 10, comprising receiving wireless local area signals via at least one wireless local area network receiver circuit within said substrate of said single chip.

12. The method according to claim 10, comprising receiving Bluetooth signals via at least one Bluetooth receiver circuit within said substrate of said single chip.

13. The method according to claim 10, comprising measuring a voltage induced across a variable resistor within a substrate of said single chip based on said at least one bias current.

14. The method according to claim 13, comprising adjusting a resistive value for said variable resistor based on a comparison of said voltage induced across said variable resistor and a voltage induced across a calibration resistor based on said at least one bias current.

15. The method according to claim 14, comprising generating plurality of distinct codewords based on said adjustment of said resistive value for said variable resistor.

16. The method according to claim 10, wherein said first of said generated plurality of distinct codewords and said second of said generated plurality of distinct codewords are the same codeword.

17. The method according to claim 10, comprising selecting a distinct codeword from said generated plurality of distinct codewords to be said first of said generated plurality of distinct codewords.

18. The method according to claim 10, comprising selecting a distinct codeword from said generated plurality of distinct codewords to be said second of said generated plurality of distinct codewords.

* * * * *